United States Patent [19]

Painter et al.

[11] 4,132,607
[45] Jan. 2, 1979

[54] PROCESS FOR FORMING A CAPSTAN

[75] Inventors: Alan Painter, Los Angeles; Daniel R. O'Neill, Santa Monica; George L. Glaeser, Jr., Culver City, all of Calif.

[73] Assignee: Telex Computer Products, Inc., Tulsa, Okla.

[21] Appl. No.: 810,690

[22] Filed: Jun. 27, 1977

Related U.S. Application Data

[62] Division of Ser. No. 644,886, Dec. 29, 1975, Pat. No. 4,065,044.

[51] Int. Cl.$^2$ .......................... C25D 1/02; C25D 7/04
[52] U.S. Cl. ........................................ 204/9; 204/25
[58] Field of Search ...................... 204/3, 4, 9, 25, 26

[56] References Cited

U.S. PATENT DOCUMENTS

| | | | |
|---|---|---|---|
| 2,592,614 | 4/1952 | Stoddard, Jr. | 204/9 |
| 3,187,639 | 6/1965 | Kelly et al. | 204/9 |
| 3,512,252 | 5/1970 | Sargent | 204/9 |

OTHER PUBLICATIONS

Product Engineering, June 5, 1961, pp. 609–614.

Primary Examiner—T. M. Tufariello
Attorney, Agent, or Firm—W. Edward Johansen

[57] ABSTRACT

The present invention is an improved capstan which is used in a magnetic tape transport system, to accelerate a length of magnetic tape. The capstan includes a cylindrical post, adapted to be connected to a drive shaft of a capstan motor in a magnetic tape transport system, a pair of discs, each of which has a set of outer holes disposed adjacent to and distributed about its periphery and a set of inner holes disposed adjacent to and distributed about its central axis, coupled together by the cylindrical post disposed about their central axes. The capstan also includes a first set of cylindrical posts, coupling the inner holes of one disc to the inner holes of the other disc, and a second set of cylindrical posts, coupling some of the outer holes of one disc to some of the outer holes of the other disc. The capstan further includes a cylindrical tape band, which has a set of grooves running concentrically with the discs and the other edges of which are joined to the peripheries of the discs. The capstan if formed by a two step process of plating a platen in the shape of the capstan with a metal, such as nickel, and then dissolving or etching away the platen in a selected solution. The resulting capstan not only has a relatively large diameter with a low moment of inertia, but also a low mass without sacrificing its structural strength.

3 Claims, 4 Drawing Figures

PROCESS FOR FORMING A CAPSTAN

This is a division of application Ser. No. 644,886, filed Dec. 29, 1975, now U.S. Pat. No. 4,065,044.

BACKGROUND OF THE INVENTION

1. Field of the Invention

The invention relates to a capstan for use in a magnetic tape transport system, and more particularly to a capstan which has a low mass and a very low moment of inertia to diameter ratio.

2. Description of the Prior Art

There are many capstans presently in use in magnetic tape transport systems for accelerating a length of magnetic tape. U.S. Pat. No. 3,261,563 entitled Magnetic Tape Reel Control Servo System, issued to Jesse I. Aweida, Donald K. Close and Henry C. Pao on July 19, 1966, teaches a magnetic tape transport system which accelerates a length of magnetic tape to 200 inches per second (ips) in 0.065 inches of magnetic tape. There are three variables, moment of inertia (I), torque (T), and radius of the capstan ($R_c$), in the equation for determining linear acceleration of a length of magnetic tape. The equation determining linear acceleration (a) is:

$$a = [(T/I) \times 2 R_c].$$

The larger the radius of the capstan ($R_c$) is, the higher its linear acceleration (a) will be for a given torque (T) and a given moment of inertia (I). Similarly, the lower its moment of inertia (I) is, the higher its linear acceleration (a) will be for a given torque (T) and a given radius of the capstan ($R_c$). The advantage of a capstan having a relatively large radius with a lower moment of inertia is that a capstan motor which drives the capstan may achieve a higher acceleration performance with the same power input, or conversely, the capstan motor may achieve the same acceleration performance with a lower power input. The capstans presently in use that have low moments of inertia have small radii; conversely, the capstans presently in use that have larger radii than the capstans having low moments of inertia have high moments of inertia.

U.S. Pat. No. 3,122,295, entitled Web Transport, issued to Richard H. Davison, John G. Simon and James O. Esselstyn on Feb. 25, 1964, teaches a capstan with a grooved surface for generating a proper air bearing between the capstan and a length of magnetic tape. U.S. Pat. No. 3,143,267, entitled Tape Handling Device, issued to Alexander R. Maxey on Aug. 4, 1964, teaches a capstan constructed as a hollow cylindrical pressure housing, the cylindrical walls of which are formed of a porous material and the interior cavity of which is coupled to through a hollow capstan drive shaft. This capstan also has a number of circumferential grooves formed in parallel planes normal to the axis of the capstan.

Most capstans are made of a lightweight metal such as aluminum in order to provide the necessary strength. However since almost all metals including aluminum have a relatively high elastic modulus, a metal capstan may be required to have considerable mass to maintain the required structural integrity while shipping, assembling and otherwise handling the capstan. If the capstan is too thin or is overloaded so as to exceed its elastic limit, the capstan will become bent or otherwise permanently distorted and thereby rendered useless. In effort to achieve low inertia by minimizing the amount of material used for construction, the strength of a conventional capstan is often reduced to such an extent that the mere inadvertent dropping of such a capstan on a hard surface if often enough to damage the capstan beyond repair in view of the close tolerances involved.

U.S. Pat. No. 3,930,603, entitled Low Inertia Capstan, issued to Frederic F. Grant on Jan. 6, 1976, teaches a capstan formed principally of thin plastic so as to decrease its mass and inertia several orders of magnitude with respect to metal capstans of comparable size without increasing its susceptibility to damage. At the same time however such capstan are constructed so as to possess the necessary strength and rigidity in a circumferential direction in which accelerating torques are applied. The inherent elasticity and thinness of the plastic parts of the capstan enable the capstan to undergo substantial resilient deformation in other than circumferential and radial directions exceeding its elastic limit while the design shape provides substantial resistance to significant deformation in the circumferential and radial directions as a result of tape forces. The capstan includes a pair of extremely thin resiliently deformable plastic webs of partially conical configuration. The webs are mounted on the opposite ends of a generally cylindrical inner hub which is substantially of plastic construction and which is rotatable about a central axis thereof. The webs are so arranged as to be separated from one another by a maximum distance at the inner hub and to draw closer together in directions toward their outer edges which support a very thin, hollow, generally cylindrical outer rim of plastic construction. The mass and resulting inertia may be even further minimized by cutting out and removing portions of the webs to define a plurality of spokes. The outer rim may be formed by turning on a lathe and finish grinding or alternatively by vacuum deep drawing.

The moment of inertia of an object is related to the mass (m) of the object and the distribution of the mass about an axis. Generally, the moment of inertia may be approximated by the equation:

$$I = [k \times (m) \times R_o^2]$$

where k is generally a coefficient varying between ½ and 1 and $R_o$ is the radius of the object. It is therefore a matter of logic that in order to reduce the moment of inertia of the object one must reduce either its mass or its radius. Reducing the radius of the object results in lowering the moment of inertia, but the lower moment of inertia is partially offset by the smaller radius which results in a higher angular acceleration to achieve the same linear acceleration. Reducing the mass of the object also lowers the moment of inertia, but the object loses structural strength as a result of lowering its mass.

Each of the prior art capstans includes a pair of discs, each of which is formed from a substantially thin, metal or plastic material and which is of a particular diameter, and a cylindrical tape band, which is of a diameter the same as the diameter of the discs. The tape band has a number of air holes distributed throughout its face so that a vacuum supply may pull the magnetic tape against the tape band and create friction between the tape band and the magnetic tape. The necessity of these air holes requires that additional mass be added to reinforce the capstan near its tape band because the air holes weaken the structural strength of the tape band. Further compounding this structural reinforcement problem, requiring additional mass, is that the discs must also be airtight in order for the vacuum supply to operate. This additional requirement means that the discs may not have any mass, unnecessary for adding to the structural strength of the capstan, removed.

In operation these vacuum holes cause air to flow unevenly over the tape band creating a non-uniform gap between the magnetic tape and the tape band. The non-uniform gap slows the acceleration of the capstan and also produces an uneven acceleration. In order to fabricate this type of capstan the two discs are bonded together to the tape band to form an air-tight assembly. This fabrication process is relatively expensive.

Another type of prior art capstan uses an adhesive coating on its cylindrical tape band to frictionally drive the magnetic tape, but there is no way to reduce this friction to zero as there is with a reversible air flow supply. All these surfaces of both types of the tape bands are presently machined to high tolerances by precision tooling in order to minimize speed variations. Furthermore, not only is the structural strength of the tape band critical to the durability of the capstans, but also the distribution of its mass is critical to the performance of the capstans in magnetic tape transport systems.

As a result of aerospace technology there are processes wherein a platen, which is formed from a material that is dissolvable in a selected solution, is plated with a material that is not dissolvable in selected solution. Some of the more common material forming the platen includes aluminum, soap, sodium bicarbonate, the non-active ingredients of pills which dissolve in water and which may be temporarily protected by a protective coating, or any other material which can be dissolved or etched away by a selected solution. Some of the more common plating materials include titanium, nickel, magnesium, aluminum and various plastic materials. However, the designs of the prior art capstans make this plating and dissolving or etching process unfeasible because there are manufacturing problems inherent in the vacuum hole design.

SUMMARY OF THE INVENTION

In view of the foregoing factors and conditions characteristic of the prior art it is an object of the present invention to provide a capstan, which has a relatively large radius, having a low moment of inertia.

It is another object of the present invention to provide a capstan that not only has a low mass, but also a sufficient structural strength to perform within a magnetic tape transport system.

It is also another object of the present invention to provide a capstan that can be manufactured at a relatively low cost by using a two step process consisting of the steps of plating a platen, which is the shape of the capstan and is formed of a dissolvable material, and dissolving the platen in dissolving solution.

It is still another object of the present invention to provide a capstan that allows an external supply of either a vacuum or an air flow to be applied thereby eliminating the need for an internal supply of either a vacuum or an air flow.

It is yet another object of the present invention to provide a capstan that need not be precision-machined in its final state in order to operate in a magnetic tape transport system.

It is yet still another object of the present invention to provide an improved capstan which is a one piece, monolithic construction.

It is still yet another object of the present invention to provide a capstan that is effective for use with back coated magnetic tapes.

In accordance with the present invention an improved capstan, which is driven by a capstan motor in a magnetic tape transport system, is described. The capstan is a one piece, monolithic construction including a pair of discs, each of which is structurally, uniformly thin and has a drive shaft hole disposed about its center adapted to be connected to the drive shaft of the capstan motor, and a cylindrical tape band, which has a number of grooves running concentrically with each of the discs. The discs have a number of inner holes of a specified diameter disposed adjacent to the drive shaft holes, the inner holes of one disc aligning the inner holes of the other disc. The capstan also includes a set of cylindrical posts of a diameter substantially equal to the diameter of the inner holes which are disposed so that they couple the inner holes of the discs together. Each disc further includes a number of outer holes of another specified diameter disposed adjacent to its periphery and aligned with the outer holes of the other disc. The capstan further includes another set of cylindrical posts of a diameter substantially equal to the diameter of the outer holes which are disposed so that they couple some of the outer holes of the discs together. The capstan is formed from a thin, heavy material such as aluminum, magnesium and titanium.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figure.

DESCRIPTION OF THE PREFERRED EMBODIMENT

Figure 1:
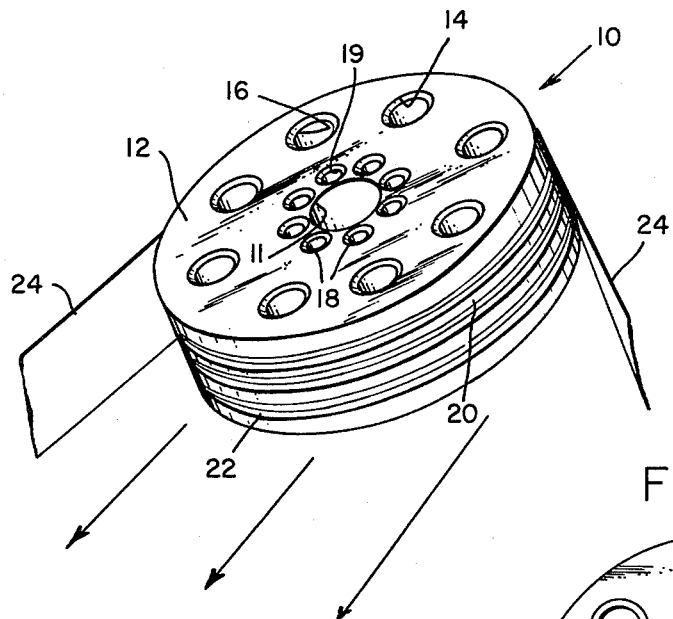
FIG. 1 is a perspective view of a capstan constructed in accordance with the principles of the present invention.

The present invention is an improved capstan for use in a magnetic tape transport system for accelerating a length of magnetic tape. The capstan is driven by a capstan motor and is mounted on a drive shaft. The present invention can best be described by reference to FIG. 1 wherein a perspective view of the preferred embodiment of the improved capstan 10 is shown. The capstan 10 is a one piece, monolithic construction including a cylindrical post, 11 which is adapted to be coupled to the drive shaft, and a pair of discs 12, each of which has a central hole adapted to receive the drive shaft and is joined to the other disc 12 by a cylindrical post 11. The cylindrical post 11 and the discs 12 are formed from a material such as nickel, magnesium, titanium, or aluminum and have walls that are substantially thin. Each disc 12 has a set of eight outer holes 14 distributed about and disposed adjacent to its periphery. These outer holes have a specified diameter based on the amount of material that can be removed from the disc 12 without reducing the structural strength of the capstan 10 below its miniumum. The capstan 10 also includes a set of four cylindrical posts 16, each having substantially the same diameter as the specified diameter of the outer holes 14, disposed perpendicular to the plane of the disc 12 in every other outer hole 14 and joining oppositely aligned outer holes 14 of the discs 12 together. The cylindrical posts 16 are hollow members. Each disc 12 also has a set of eight inner holes 18 distributed about and disposed adjacent to its central axis. These inner holes 18 have another specified diameter based on their distribution and proximity to the central axis. The capstan 10 further includes a set of eight cylindrical posts 19, each having substantially the same diameter as the specified diameter of the inner holes 18, disposed perpendicular to the plane of the disc 12 in the inner holes 18 and joining oppositely aligned inner holes 18 of the discs 12. The function of the two sets of cylindrical posts 16 and 19 is to add to the structural strength of the capstan 10 while allowing the removal of material from the capstan 10 where it is not critical to its structural strength.

Figure 2:
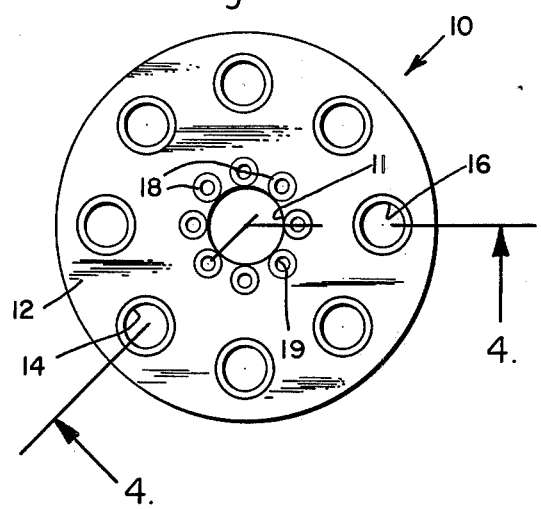
FIG. 2 is a top plan view of the capstan of FIG. 1.

Referring now to FIG. 2, a top plan view of the capstan 10, the mass of the disc 12 ($m_d$) is determined by the equation:

$$m_d = [(D \times t) \times (\pi R_c^2 - \pi R_s^2 - 8\pi R_o^2 - 8\pi R_i^2)]$$

where D = the density of the capstan material, t = the thickness of the walls of the capstan, $R_c$ = the radius of the capstan, $R_s$ = the radius of the drive shaft, $R_o$ = the radius of the outer holes, and $R_i$ = the radius of the inner holes. In the various alternative embodiments of the improved capstan there may be more or less than eight outer holes and more or less than eight inner holes. Presently the inventors have developed two other embodiments, one having three, relatively large, non-circular outer holes and eight inner holes, and the other having six, larger than each of the eight outer holes, outer holes and eight inner holes.

The moment of inertia of the disc 12 ($I_d$) about its central axis is determined by the following equation:

$$I_d = I_{d(T)} - 8[(I_o + Dt\pi R_o^2 H_o^2) + (I_i + Dt\pi R_i^2 H_i^2)]$$

where $I_{d(T)} = \frac{1}{2} Dt\pi[R_c^4 - R_s^4]$ = the moment of inertia of a circular disc of radius $R_c$, $I_o = \frac{1}{2} Dt\pi R_o^4$ = the moment of inertia of a circular disc of radius $R_o$, and $I_i = \frac{1}{2} Dt\pi R_i^4$ = the moment of inertia of a circular disc of radius $R_i$, $H_o$ = the distance that the center point of each outer hole 14 is from the central axis of the capstan 10 and $H_i$ = the distance that the center point of each inner hole 18 is from the central axis of the capstan 10. The larger the number of these inner holes 18 and outer holes 14 is and the larger the radii of these holes 14 and 18 are, the lower the moment of inertia of each disc 12 will be.

Figure 3:
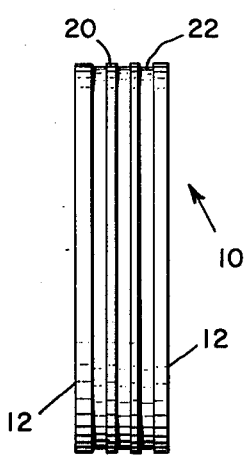
FIG. 3 is a side plan view of the capstan of FIG. 1.

Referring now to FIG. 3, a plan view of the capstan 10 show that it also includes a cylindrical tape band 20 having a radius equal to the radius of the capstan 10 ($R_c$) and a set of three grooves 22 running concentrically with the discs 12. The mass of the cylindrical tape band 20 ($m_b$) is determined by the following equation:

$$m_b = Dt[(2\pi R_c) \times (w_c - 3w_g) + 3(2\pi \times (w_g) \times (R_c - d_g) + 6\pi(2R_c d_g - d_g^2)] = 2\pi Dt[(R_c w_c) + 3(2R_c d_g - w_g d_g - d_g^2)],$$

where $w_c$ = the width of the capstan 10, $w_g$ = the width of each groove 22, and $d_g$ = the depth of each groove 22. The moment of inertia ($I_b$) of the tape band is determined by the following equation:

$$I_b = Dt[(2\pi R_c) \times (w_c - 3w_g) \times (R_c^2) + 3(2\pi w_g) \times (R_c - d_g)^3 + 6\pi(2R_c d_g - d_g^2) \times (R_c - d_g)^2] = m_b R_c^2$$

Figure 4:
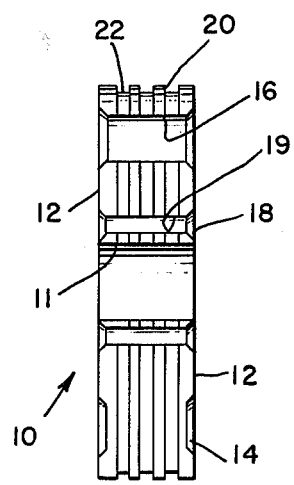
FIG. 4 is a cross-sectional view of the capstan of FIG. 2 taken along line 4—4.

Referring now to FIG. 4, a cross-sectional side view of the capstan 10 shows that the outer holes 14 have cylindrical posts 16 placed in some of them. Each of these posts 16 contributes a mass ($m_{op}$) and a moment of inertia ($I_{op}$) determined by the following equations:

$$m_{op} = Dt[2\pi R_o w_c]$$

and $$I_{op} = Dt[2\pi R_o^3 w_c + 2\pi R_o H_o^2 w_c]$$

The cross-sectional side view of the capstan 10 also shows that the inner holes 18 have cylindrical posts 19 placed in all of them. Each of these posts 19 contributes a mass ($m_{ip}$) and a moment of inertia ($I_{ip}$) determined by the following equations:

$$m_{ip} = Dt[2\pi R_i w_c]$$

and $$I_{ip} = Dt[2\pi R_{ip}^3 w_c + 2\pi R_i H_i^2 w_c]$$

When one combines all of these mass equations, he may determine the mass of the capstan 10 ($m_c$) using the following equation:

$$m_c = [2m_d + m_p + 8m_{ip} + 4m_{op} + m_b]$$

where $m_p$ = the mass of the cylindrical post of radius $R_s = Dt[2\pi R_s w_c]$. When one combines all of these moment of inertia equations, he may determine the moment of inertia of the capstan 10 ($I_c$) using the following equation:

$$I_c = [2I_d + 8I_{ip} + 4I_{op} + I_p]$$

where $I_p$ = the moment of inertia of the cylindrical post = $Dt[2\pi R_s^3 w_c]$ It is apparent from the above-mentioned equations that the moment of inertia of the capstan 10 ($I_c$) to its radius ($R_c$) ratio can be decreased by either making the outer holes 14 more numerous or larger than the eight hole capstan 10, but it is also apparent that the capstan 10 must be reinforced with more cylindrical posts 16 and 19 in the outer holes 14 and the inner holes 18, respectively, in order to retain its structural strength. The present design of the capstan 10 enables the inventors to further reduce the mass of the capstan 10 ($m_c$) by decreasing the thickness of the capstan's walls (t). This is accomplished by a process of plating a platen and dissolving away the platen in a dissolving solution.

The process of plating the platen is not only applicable to the capstan 10 of the preferred embodiment, but also to a capstan that has air holes rather than grooves as do the prior art capstans. The principle of minimizing the moment of inertia to radius ratio of the capstan is accomplished by following the design considerations spelled by the equations for determining mass and moment of inertia of the capstan.

The process of forming the improved capstan 10 includes the steps of (1) plating a platen with a metallic material which has the same shape as the capstan 10 and (2) dissolving away the platen in a dissolving solution thereby leaving the capstan 10. When the platen is aluminum, an excellent dissolving solution is sodium hydroxide, although any solution may be used that will dissolve the aluminum and will not dissolve the metallic plating material. The inventors have found that a capstan formed from nickel by either an electrodeless deposition or an electrode deposition is not only light in weight, but also durable in structural strength. The inventors have also fabricated the capstan from magnesium, titanium and aluminum. Furthermore, the by using a platen formed of sand, the design of the capstan allows it to be injection-molded out of a plastic material. The essential feature of the design of the capstan 10 is that its one piece, monolithic construction not only enhances its structural strength, but also lowers its moment of inertia to radius ratio.

Returning to FIG. 1, the capstan 10 has its tape band 20 joined to the outer peripheries of the discs 12 along its outer edges. In operation a vacuum source, indicated by arrows in FIG. 1, pulls a length of magnetic tape 24 against the tape band 20 by creating a vacuum within the grooves 22 thereby frictionally engaging the length of magnetic tape 24. The surface of the tape band is finished relatively rough in order to increase its coefficient of friction. By reversing the vacuum supply to an air supply, the use of grooves 22 allows the length of magnetic tape 24 to be blown off the capstan 10 in order to disengage it from the capstan 10.

Until the invention of this capstan there have been no capstans that have low enough moment of inertia to radius ratios and sufficient structural strength to enable their use with smaller capstan motors presently in use. Furthermore, the grooves in the cylindrical tape band of the capstan, which eliminate the air holes, create a more uniform gap between the magnetic tape and the tape band than the gaps created by the capstans of the prior art, The advantage of this improved capstan is that not only does it accelerate quicker, but it also provides a smoother acceleration than the capstans of the prior art. Another advantage of this capstan is that the tape band can be adapted to any width, within the width of the tape band, of magnetic tape.

From the foregoing it can be seen that an improved capstan has been described. Accordingly, it should be noted that the figures are not drawn to scale, and that distance of and between the figures are not to be considered significant.

Accordingly, it is intended that the foregoing disclosure and showing made in the drawing shall be considered only as illustrations of the principles of the invention. For example, the grooves in the tape band 20 may be any one of numerous configurations, such as v-shaped, any size in both depth and width, and any number of grooves. In fact, in some embodiments of the invention, the grooves in the tape band 20 are replaced by a knurl surface serving as air holes. The capstan 20 has a wall thickness (t) that is substantially thin and is in the range of 0.0003 inches to 0.015 inches, but some embodiments of the capstan may require a thicker wall when more structural strength is required.

Although the capstan 10 has been specifically designed for use in a magnetic tape transport system, it can also be used in other operations whenever a spool with a low mass and a low moment of inertia to radius ratio is required. The invention is to be limited only by the scope of the claims which are appended to this specification.

What is claimed is:

1. A process for forming a capstan which is a monolithic member having a pair of disc-shaped sidewalls and a cylinder-shaped sidewall coupling the periperhies of said disc-shaped sidewalls so that they are parallel to each other, said process comprising the steps of:
   a. forming a platen of a dissolvable material, said platen having a pair of disc-shaped sidewalls and a cylindrically shaped sidewall and also having a plurality of holes for forming a plurality of cylindrical posts;
   b. electroplating said platen with a platen material; and
   c. dissolving said platen in a dissolving solution thereby leaving said capstan.

2. A process for forming a capstan according to claim 1 wherein said platen is aluminium and said dissolving solution is sodium hydroxide.

3. A process for forming a capstan according to claim 2 wherein said electroplating step comprises electroplating of nickel.

* * * * *